United States Patent [19]

Stone

[11] Patent Number: 4,531,620
[45] Date of Patent: Jul. 30, 1985

[54] FREEWHEEL RAMP/ROLLER CLUTCH WITH POSITIVE LOCK-OUT

[75] Inventor: Robert A. Stone, Sandy Hook, Conn.

[73] Assignee: United Technologies Corporation, Hartford, Conn.

[21] Appl. No.: 554,145

[22] Filed: Nov. 21, 1983

[51] Int. Cl.³ .............................................. F16D 3/34
[52] U.S. Cl. ....................................... 192/45; 192/38; 192/47
[58] Field of Search ................................... 192/45–47, 192/38

[56] References Cited

U.S. PATENT DOCUMENTS

| | | | |
|---|---|---|---|
| 2,049,880 | 8/1936 | Winkler | 192/45 |
| 2,172,653 | 9/1939 | Flogans | 192/45 |
| 3,184,020 | 5/1965 | Benson et al. | 192/45 |
| 3,187,869 | 6/1965 | Spencer | 192/45 |
| 3,380,564 | 4/1968 | Beurer | 192/47 |
| 3,625,324 | 12/1971 | Scharf | 192/45 |
| 4,341,294 | 7/1982 | Kerr | 192/45 |
| 4,350,235 | 9/1982 | Brownett | 192/45 |

Primary Examiner—Henry C. Yuen
Attorney, Agent, or Firm—M. P. Williams; Gerald E. Linden

[57] ABSTRACT

A ramp/roller freewheeling clutch (FIG. 2) has a driving member with ramps 19 adapted to wedge rollers 21 against the driving surface 28 of a driven member 29 when the driving member 13 is rotated in the driving direction. The rollers are positioned adjacent the ramps by a primary cage 22, which can be rotated with respect to the driving member 13 so as to force the rollers out of engagement with the ramps 19 and into recesses 20. A secondary cage 39 disposed in fixed relation with the driving member 13 has cam surfaces 37 such that rotation of the primary cage to disengage the rollers forces them up the ramps and locks them in place with the recesses 20 of the driving member 13, thereby to avoid contact with the driven member 29 when the clutch is disengaged.

1 Claim, 5 Drawing Figures

FREEWHEEL RAMP/ROLLER CLUTCH WITH POSITIVE LOCK-OUT

DESCRIPTION

1. Technical Field

This invention relates to ramp/roller freewheel clutches which may be actuated to disengage so that the driving member may rotate, with the driven member at rest, and more particularly to positive disengagement of the rollers so that clutch components are not damaged by operation in the disengaged mode.

2. Background Art

Ramp/roller freewheel clutches have long been used in helicopters to provide freewheeling (overrunning) capability required for autorotation, that is, when the rotor is driven by aerodynamic forces at a rotary speed in excess of the rotor driving shaft speed. The ramp/roller clutches have a driving member which resembles a sprocket, but with ramps in place of chain-driving teeth, between recesses in the driving member. The driven member is simply a hollow cylindrical bore. The rollers are interposed between the driving member and the driven member and positioned circumferentially by a cylindrical cage so that each roller is specifically related to one of the ramps. When the driving member is driving in the forward direction, it pushes on the rollers, forcing them up the ramps so that the rollers become wedged between the ramps of the driving member and the internal bore of the driven member. If the driven member rotates faster than the driving member, it tends to push the rollers down the ramps so that they lose contact with the driven member and the clutch is thus in the freewheeling mode.

Military freewheel clutches are provided with means to move the cage circumferentially relative to the driving member thus forcing the rollers into the disengaged position. However, with the engine running and the clutch in the disengaged mode, the rollers rotate with the driving member at speeds on the order of 8,000 RPM. Even though the rollers are only about two centimeters long and one centimeter in diameter, in a clutch having a driven member bore radius of about nine centimeters, the centrifugal force exerted by each roller may be on the order of 45 kilograms (100 lbs.). If the driven member is stationary, the frictional force between it and the rollers, as the rollers revolve with the driving member, can cause the rollers to attain rotary speeds about their own axes in excess of 50,000 RPM. The rapidly spinning and revolving rollers make contact with and bump against the face of the cage bars which disrupts their rolling behavior and causes them to scuff along the bore of the driven member. In the case of a helicopter utilizing such a freewheel clutch for the main rotor, the instances of autorotation are usually relatively short in duration, being a minute or so. Furthermore, the rotor speed is near that of the shaft speed, so the rollers do not spin at the same high speeds as they do with the rotor at rest. Therefore, the amount of damage that is done to the clutch during autorotation as a consequence of the aforementioned problems is minimal. However, in the case of military helicopters, ordinary operating procedures require that at least one of the engines of the helicopter be running for twenty or thirty minutes while a helicopter is on deck in a condition of readiness (with its hydraulic, lubrication and electric systems running), but without the rotor turning. In such a case, the driven member is stationary (rather than operating at a speed which may be near that of the driving member as in the case of autorotation), causing the excessively high rotary speeds of the rollers, which causes, in part, the erratic movement of the rollers as they contact various surfaces, such as the bars of the cage.

One major step in overcoming the problem could be the elimination of spinning of the rollers. While it may appear that highly lubricated surfaces would allow the rollers to slide along the inner bore of the driven member, it turns out that the high centrifugal forces cause the lubricant to be dispersed at the point of contact of the rollers with the bore (the rollers bite right through it). In U.S. Pat. No. 3,548,982, it is suggested that spring pressure can be applied to the ends of the rollers to keep them from turning and bouncing around during clutch disengagement. However, that notion is unrealistic in view of the high centrifugal force created by each roller when rotating with the driving member. Similarly, the use of other techniques, such as magnetism, to prevent roller spinning and erratic motion are not practical in view of the high centrifugal forces involved, particularly within the size and configuration constraints otherwise dictated for a freewheeling clutch of the type useful in a helicopter.

In U.S. Pat. No. 2,049,880, a freewheeling ramp/roller clutch for a bicycle is described. Therein, a second cage is provided outwardly of the main cage and adapted to revolve with the driving member. The second cage is so positioned that when the driving member is driven in reverse (such as by a slight amount of backpedaling of the bicycle) the relative motion thereof with respect to the rollers causes the rollers to move into recesses which are sufficiently radially inward that the rollers no longer contact the bore of the driven member, pulling the primary cage along with them. With the driving member thus positioned relative to the primary cage, the outer cage tends to partially close the aperture for the rollers so that they are in a sense locked away from contact with the inner bore of the driven member. This device is, however, of no use in helicopters since there is no way to effect complete disengagement except by reversing the direction of rotation of the driving member (backpedaling), which is impossible in a helicopter. Even more importantly, the disengagement is effected while the clutch is basically at rest, with no centrifugal force on the rollers. For value in a helicopter, a disengagement of a double cage clutch of the type described in said patent may require 500 kilograms (1000 lbs.) of force exerted between the driving member and the primary cage so as to force the rollers inwardly and out of contact with the bore of the driven member. Other, less relevent patents that relate generally to ramp/roller type clutches are U.S. Pat. Nos. 2,001,668; 2,049,880; 3,476,226; 3,958,679.

DISCLOSURE OF INVENTION

Objects of the invention include provision of a ramp/roller clutch which can be in full disengagement with the driven member at rest with minimal wear on clutch components.

According to the present invention, a ramp/roller freewheel clutch in which the rollers are moved between an engaged position and a disengaged position by means of a primary cage includes a secondary cage disposed between the primary cage and the bore of the driven member, the secondary cage being disposed in fixed angular position with respect to the driving member and having ramp surfaces that force the rollers into a locked position in which they are out of engagement with the bore of the driving member and locked, by wedging, against any form of motion when the primary cage is rotated into the disengaged position. Although designed originally for use as the freewheel clutch of a helicopter main rotor, the invention may be utilized in a wide variety of applications.

The foregoing and other objects, features and advantages of the present invention will become more apparent in the light of the following detailed description of exemplary embodiments thereof, as illustrated in the accompanying drawings.

BEST MODE FOR CARRYING OUT THE INVENTION

Figure 1:
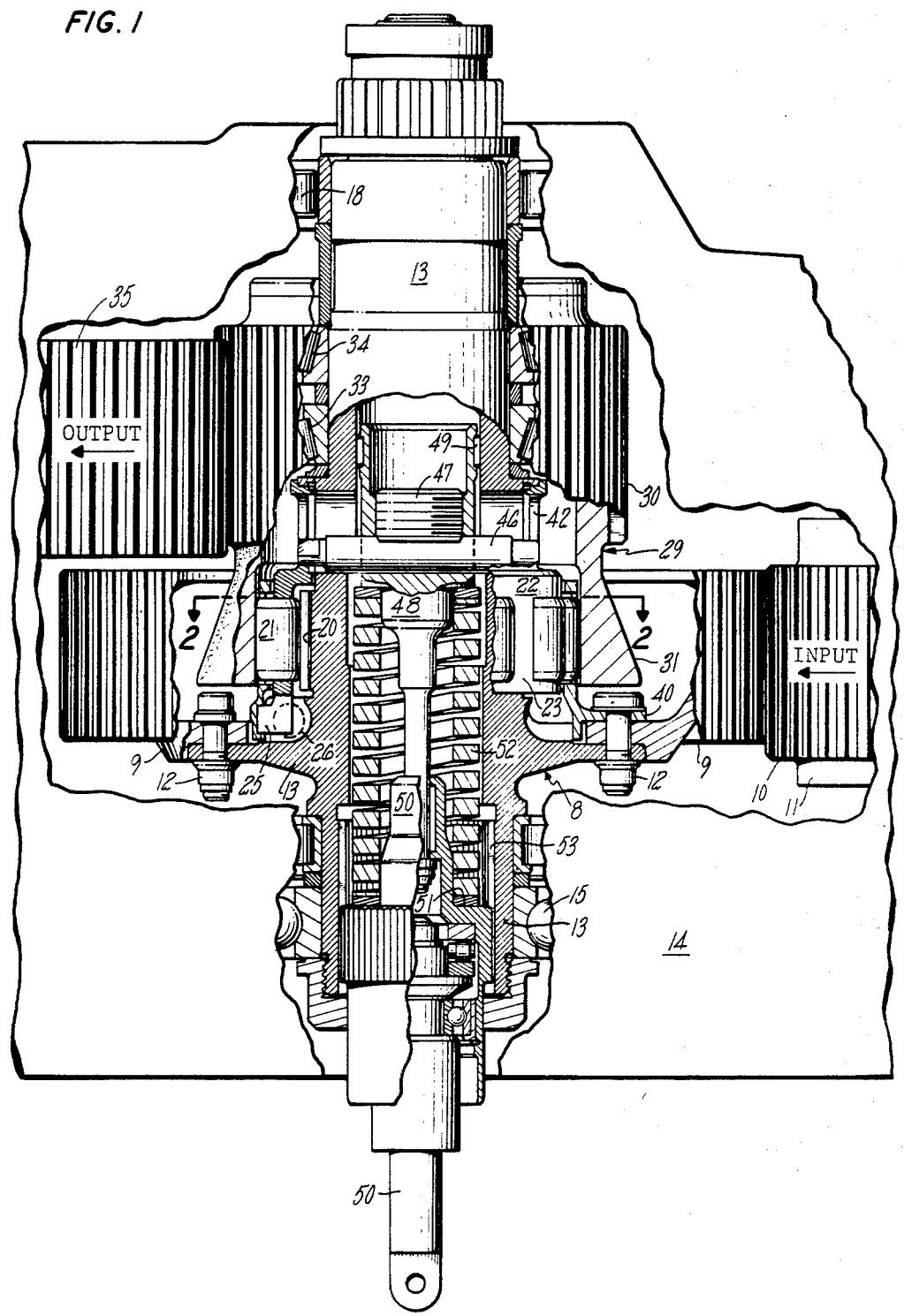
FIG. 1 is a partially broken away, sectioned, side elevation view of a ramp/roller freewheel clutch incorporating the present invention.
Figure 2:
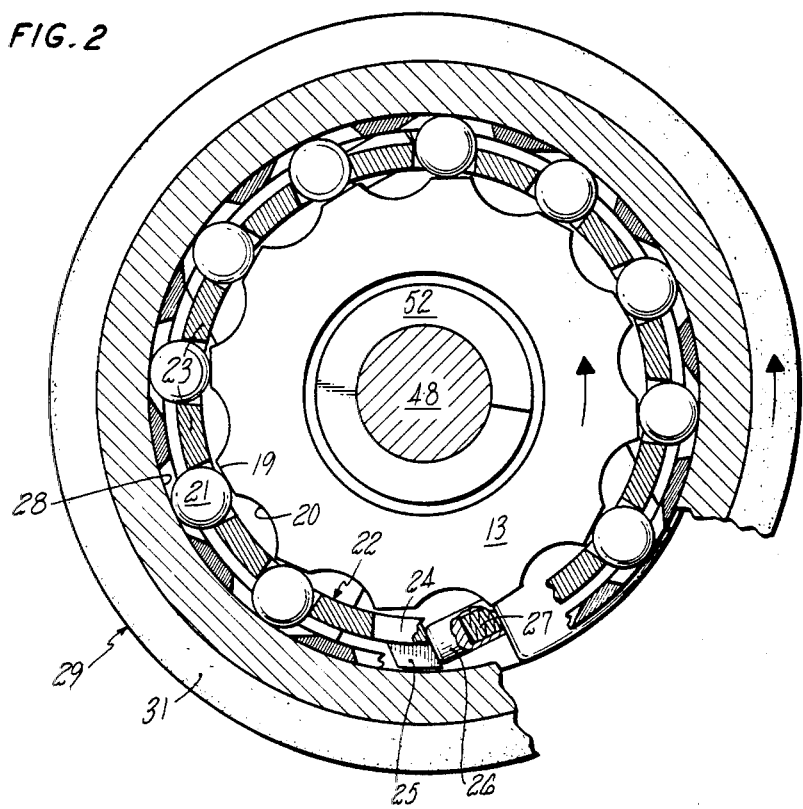
FIG. 2 is a partially broken away section of the clutch taken on the line 2—2 in FIG. 1, with the primary roller cage positioned so that the clutch is engaged.

Referring now to FIG. 1, the principal driving unit 8 includes a dish shaped spur gear 9 which is driven by a spur gear 10 connected to a shaft 11 that is driven by the engine (not shown). The spur gear 9 is connected by bolts 12 to a driving member 13 which is rotatably mounted to the stationary housing 14 through bearings 15, 18. In FIG. 2, the driving member 13 is seen to be sprocket-like, having a plurality of ramp surfaces 19 interspersed with recesses 20, each pair of ramp and recess 19, 20 relating to a corresponding roller 21. The rollers are spaced peripherally about the driving member 13 in proper relationship to the ramps and recesses 19, 20 by a primary cage 22 which consists of spaced apart vertical bars 23 with apertures 24 therein, as illustrated more clearly in FIG. 4. The primary cage 22 has a lug 25 which is urged clockwise as seen in FIG. 2 by a pin 26 in response to a spring 27, the other end of which is disposed on the driving member 13, thereby to normally cause the clutch to be in the engaged state illustrated in FIG. 2.

With the driven member 13 turning counterclockwise as illustrated in FIG. 2, each roller 21 is wedged between a corresponding ramp 19 and the bore 28 of a driven member 29, which is basically a hollow cylindrical spur gear portion 30 (FIG. 1) with a skirt portion 31 within which the bore 28 is formed. The driven member 29 is rotatably supported on the driving member 13 by suitable bearings 33, 34. The spur gear portion 30 of the driven member engages a gear 35 that is connected to the driven functional unit, such as the main rotor of a helicopter (not shown).

The freewheeling characteristic of the clutch comes into play in an overrunning condition - that is, when the driven member 29 rotates at a higher speed than the driving member 13. In such a case, friction between the driven member bore 28 and the rollers 21 cause them to achieve a higher speed than the driving member 13, so the rollers are pushed down the corresponding ramps 19 to a point where they are no longer wedged between the ramps 19 and the bore 28. But since the driven and driving members 29, 13 are operating at speeds that are relatively close to each other (in contrast with the case where the driven member is at rest), the rollers 21 are not advanced to high rotary speeds about their own axes, so that contact with the cage bars 21, ramps 19 and bore 28 do not impart the tumultuous action that can result when the clutch is fully disengaged.

Figure 3:
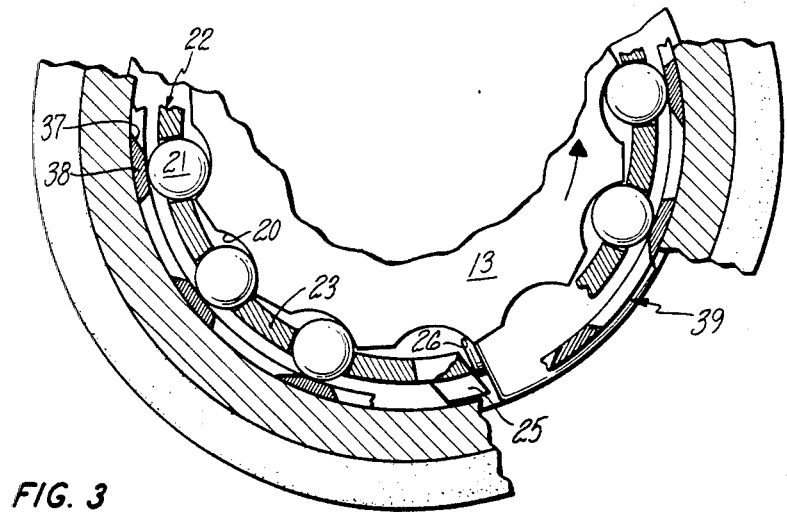
FIG. 3 is a partial, sectioned plan view as in FIG. 2, but shown with the primary roller cage displaced so that the clutch is disengaged.

To fully disengage the clutch, the primary cage 23 is rotated counterclockwise with respect to the driving member 13 (FIG. 3), so that the rollers 19 are advanced into corresponding recesses 20 of the driven member. (The means for rotating the primary cage for disengagement is described hereinafter.) In accordance with the invention, movement of the primary cage 22 counterclockwise with respect to the driving member 13 causes each of the rollers to be pushed up a corresponding ramp 37 of a bar 38 in a secondary cage 39 which is illustrated more fully in FIG. 5. Because the secondary cage 39 is mounted directly to the driving member 13 by means of flanges 40 and bolts 12 (FIG. 1), the secondary cage 39 will retain its original position with respect to the driving member 13, so that the rollers 21 become lodged between the recesses 20 and the bars 38 of the secondary cage, when the primary cage 22 is moved relatively counterclockwise with respect to the driving member 13.

Figure 4:
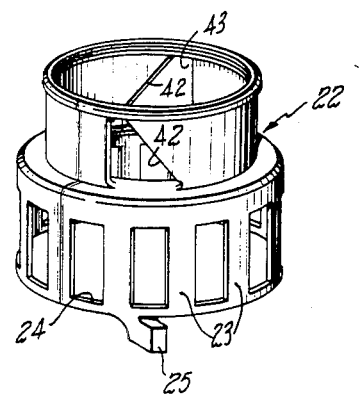
FIG. 4 is a perspective view of the primary roller cage.

Referring to FIGS. 2 and 4, the primary cage 22 is normally urged in a clockwise direction with respect to the driving member 13 by clockwise force of the spring 27 and pin 26 to the lug 25. In order to move the primary cage 22 from the engaged condition of FIG. 2 to the disengaged condition of FIG. 3, it is necessary to rotate the primary cage 22 counterclockwise with respect to the driving member 13 (compare FIG. 2 and FIG. 3). This is achieved by an axially longitudinal force on cam surfaces 42 in generally triangular slots 43 illustrated in FIG. 4, by means of a pin 46 (FIG. 1) which is securely fixed, as by a threaded plug 47, crosswise in a first translatable shaft 48. The shaft 48 is provided with splines 49 to prevent it from rotating, whereby an upward force (as in FIG.1 ) on the shaft 48 will cause the pin 46 to rise upwardly against the cam surfaces 42. Due to the splines 49 between the shaft 48 and the driving member 13, the primary cage 22 will thus be rotated counterclockwise with respect to the driving member 13, as illustrated by comparison of FIGS. 2 and 3. The lower end of the shaft 48 is slidably supported by another shaft 50 which has a shoulder 51 that bears against a spring 52, the other end of which bears against a shoulder on the shaft 48 as illustrated in FIG. 1, so that upward motion of the shaft 50 will impart the force of the spring 52 against the shaft 48. The shaft 50 is similarly provided with splines 53 to prevent rotation of the shaft 50 with respect to the driving member 13 so as to void imparting any torque backward to the mechanism which provides the upward motion to the shaft 50. Such mechanism (not shown) may comprise an electric or hydraulic actuator which is operable in response to a pilot command, capable of providing a sufficient force of the type described hereinbefore. The force in the shaft 50 is imparted to the shaft 48 through the spring 52 to accommodate the situation where the driving member is driving the driven member with very high load on the driven member (as during acceleration of a helicopter rotor). An attempt by the pilot to disengage the clutch at that time will simply compress the spring 52, and avoid doing any damage to the clutch components. As the speed of the driven member reaches that of the driving member, so that the load transferred therebetween by the rollers is less, the force of the spring will then cause the pin to rise (as in FIG. 1) and rotate the primary cage counterclockwise, thus disengaging the clutch. The generally triangular slots 43 in the primary cage 22 allow the disengaging pin 46 to drop (as viewed in FIG. 1) even though an overspeed condition may exist and the driven member 29 may be freewheeling, thus tending to pull the secondary cage along by means of the friction between the rollers and the surfaces of the cage bars 38. Thereafter, as the driven member 29 slows down and the driving member 13 rotates counterclockwise with respect thereto, the driving member will advance ahead of the rollers 21, allowing them to fall more deeply into the recesses 20, thereby relieving the pressure on the rollers 21, so that the primary cage will be rotated clockwise with respect to the driving member 13 as a consequence of the force of spring 27 against pin 26 and lug 25 (FIG. 2).

Although the invention has been shown and described with respect to exemplary embodiments thereof, it should be understood by those skilled in the art that various changes, omissions and additions may be made therein and thereto, without departing from the spirit and the scope of the invention.

I claim:

1. A ramp/roller freewheeling clutch comprising:
  a driven member having a cylindrical driving surface;
  a plurality of rollers disposed adjacent said driving surface;
  a generally cylindrical driving member disposed radially inward of said rollers and having a recess in its peripheral surface respectively corresponding to each of said rollers, a ramp surface corresponding to each of said recesses and extending from the corresponding recess to the next adjacent recess, each of said ramp surfaces being increasingly radially outward as it extends from the corresponding recess;
  means for rotating said driving member in a driving direction;
  a primary cage having a plurality of apertures therein, each aperture corresponding to one of said rollers, said primary cage being disposed between said driven member and said driving member and adapted to position each of said rollers at a like position with respect to the corresponding recess and ramp;
  means for urging said primary cage in a direction with respect to said driving member so as to cause said rollers to be moved upwardly on the corresponding ramp surfaces, said ramp surfaces being spaced from said driving surface such that motion of the driving member in said driving direction causes said rollers to become wedged between said ramp surfaces and said driving surface;
  a secondary cage disposed in fixed relationship with said driving member between said driving member and said driving surface of said driven member, said secondary cage having a plurality of spaced apart bars defining apertures through which said rollers may contact said driving surface of said driven member, characterized by:
  said secondary cage comprising ramp surfaces on said bars disposed so that motion of said primary cage with respect to said driving member in said driving direction will cause said rollers to engage said ramp surfaces on said bars and will be forced radially inwardly from said driving surface of said driven member; and
  means actuable to drive said primary cage relative to said driving member in said driving member in said driving direction of said driving member.

* * * * *

UNITED STATES PATENT AND TRADEMARK OFFICE
CERTIFICATE OF CORRECTION

PATENT NO. : 4,531,620

DATED : July 30, 1985

INVENTOR(S) : Robert A. Stone

It is certified that error appears in the above-identified patent and that said Letters Patent is hereby corrected as shown below:

Column 1, after "DESCRIPTION" insert the paragraph --The Government has rights in the invention pursuant to a contract awarded by the Department of the Navy--.

Figure 5:
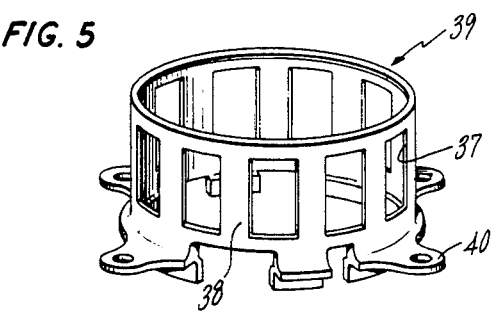
FIG. 5 is a perspective view of the secondary roller cage in accordance with the present invention.

Column 4, lines 21 - 22: change "illustrated more fully in Fig. 5....mounted" to --illustrated more fully in Fig. 5....mounted--.

Column 4, line 59: change "void" to --avoid--.

Column 6, line 37: after "member in said" delete "driving member in said".

Signed and Sealed this

Seventh Day of July, 1992

*Attest:*

DOUGLAS B. COMER

*Attesting Officer*  *Acting Commissioner of Patents and Trademarks*